March 6, 1962

G. H. ROYER 3,024,369

SWITCHING APPARATUS COMPRISING PLURAL BASE HYPERCONDUCTIVE TRANSISTORS

Filed Dec. 4, 1957

WITNESSES:

Bernard R. Gieguay

Myron E. Click

INVENTOR

George H. Royer

BY F. E. Browder

ATTORNEY 3,024,369
Patented Mar. 6, 1962

3,024,369
SWITCHING APPARATUS COMPRISING PLURAL BASE HYPERCONDUCTIVE TRANSISTORS

George H. Royer, Highland, N.Y., assignor to Westinghouse Electric Corporation, East Pittsburgh, Pa., a corporation of Pennsylvania Filed Dec. 4, 1957, Ser. No. 700,679
5 Claims. (Cl. 307—88.5)

Figure 1:
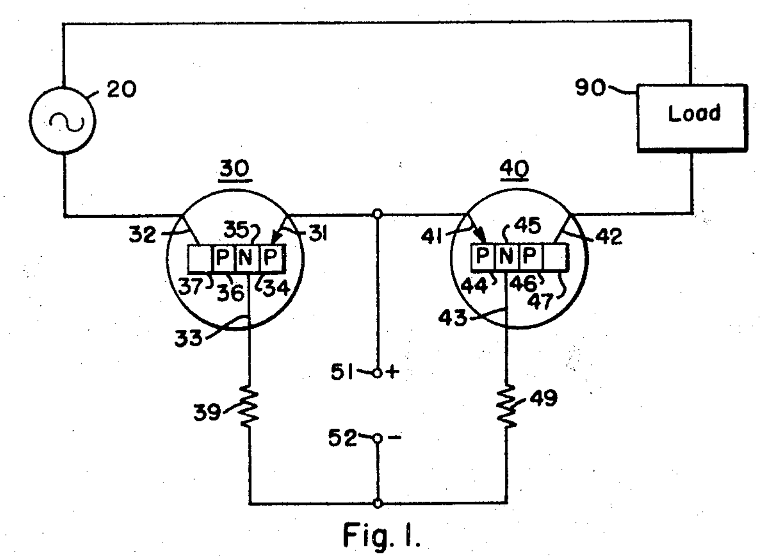

This invention relates to switching apparatus in general and in particular to alternating-current voltage switches.

The advent of a hyperconductive semiconductor transistor switch has led to new switching applications. These hyperconductive transistor switches comprise either a PNP or an NPN structure, with an associated mass-of-metal attached to one of the zones having P-type conductivity in the former, or to one of the zones having N-type conductivity in the latter structure, and a base contact ohmically affixed to the intermediate zone in either structure. Electrical leads are connected to the first conductivity zones in either type of structure, to the base contact and to the mass-of-metal.

This hyperconductive transistor switch functions in a unique manner. If a reverse potential is applied to a circuit between the mass-of-metal and the first conductive zone, with no voltage being applied to the base contact, the hyperconductive transistor will be so highly resistant that up to a predetermined point, less than a milliunit of current will flow even at a substantial number of voltage units. However, as the number of negative voltage units is increased, there is reached a point at which a critical current and voltage is applied and the semiconductor transistor device will suddenly become hyperconductive so that a potential of approximately one voltage unit will sustain a high current of up to approximately ten current units. This hyperconductive point may be varied in any particular hyperconductive transistor switch so as to occur at, for example, 45 voltage units to 150 voltage units reverse potential. By applying a small biasing potential to the base contact, the hyperconductive breakdown point can be controlled so as to occur at lower reverse potential and current. A biasing current of the order of from 1 to 3 milliunits of current will be effective to cause hyperconductive breakdown to occur as desired.

Such a hyperconductive semiconductor transistor switch is described in a copending application of John Philips, Serial No. 649,038, entitled "Semiconductor Transistor Switches," filed March 28, 1957, assigned to the same assignee as the present invention. For a more detailed description of the construction, characteristics and operation of such a hyperconductive semiconductor transistor switch, reference is made to the above-mentioned copending application, Serial No. 649,038.

It is an object of this invention to provide an improved switching apparatus.

It is a further object of this invention to provide improved switching apparatus for the control of alternating-current voltages.

It is a still further object of this invention to provide an improved switching apparatus utilizing hyperconductive semiconductor transistor switches.

Further objects of this invention will become apparent in the following description when taken in conjunction with the accompanying drawing. In said drawing, for illustrative purposes only, is shown a preferred embodiment of the invention.

Figure 2:
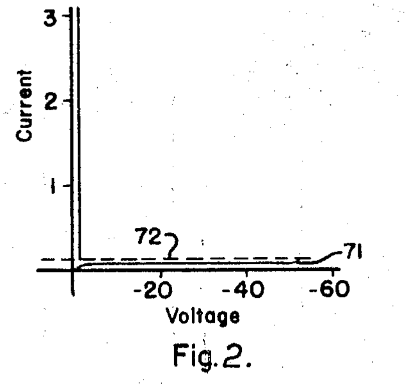

FIGURE 1 is a schematic diagram of an improved switching apparatus embodying the teachings of this invention; and FIG. 2 is a diagram of a curve plotting the operation of a hyperconductive semiconductor transistor switch of the type utilized in this invention.

Referring to FIG. 1, there is illustrated an improved switching apparatus which comprises in general a source of alternating potential 20, hyperconductive transistor switches 30 and 40, terminal means 51 and 52 for connecting a biasing potential to said switches 30 and 40, and a load 90.

The hyperconductive transistor switch 30 comprises an emitter 34, a first base member 35, a second base member 36 and a mass-of-metal 37 in intimate contact with the second base member 36. In addition, there are provided two terminal electrodes 31 and 32 for making electrical connection with the emitter 34 and mass-of-metal 37, respectively. The electrode 33 provides for making electrical contact with the first base element 35.

The hyperconductive transistor switch 40 comprises an emitter 44, a first base member 45, a second base member 46 and a mass-of-metal 47 in intimate contact with the second base member 46. In addition, there are provided two terminal electrodes 41 and 42 for making electrical connection with the emitter 44 and mass-of-metal 47, respectively. The electrode 43 provides for making electrical contact with the first base member 45.

The emitters 34 and 44 of the switches 30 and 40, respectively, are connected to the terminal 51 by the electrodes 31 and 41, respectively. The first base members 35 and 45 are connected to the terminal 52 through current limiting resistors 39 and 49 by the electrodes 33 and 43, respectively. The mass-of-metal 37 of the hyperconductive transistor switch 30 is serially connected through the electrode 32, the alternating current source 20, the load 90 and the electrode 42 to the mass-of-metal 47 of the hyperconductive transistor switch 40. The hyperconductive switches 30 and 40 thus have a series back-to-back circuit connection with the alternating potential 20.

Referring to FIG. 2, it may be seen that the hyperconductive transistor switches are highly resistant to the flow of current when reverse voltages below the breakdown voltage are impressed across the emitter and mass-of-metal members. The hyperconductive transistor switch for which the curve 71 was plotted had no current applied to the base contact by the biasing circuit, and it became highly conductive or hyperconductive when a potential of —55 voltage units and about 1 milliunit of current was applied, such that the voltage dropped along the line 72 to a value of approximately 1 voltage unit at which it supported a relatively high current flow in current units. Thus the hyperconductive transistor switch when subjected to predetermined operating conditions abruptly becomes a conductor with low ohmic resistance.

The hyperconductive transistor switch hereinbefore described will respond to different operating conditions. When connected in a circuit, the voltage impressed across the emitter and mass-of-metal and the biasing current delivered through the first base cooperate in rendering this hyperconductive transistor switch highly conductive at a selected reverse current and voltage. As the base biasing current is increased, the reverse voltage at which the hyperconductive transistor switch becomes highly conductive becomes lower, while if the base biasing current is decreased, the voltage at which it becomes highly conduce is increased. Thus by varying the base biasing curıt the breakdown voltage can be controlled. When ltage is impressed across the hyperconductive transistor itch in the forward direction, the transistor switch will have like a regular diode having voltage impressed ross it in the forward direction.

Assuming that the peak value of the alternating potenl 20 is below the breakdown voltage of the switches and 40, then when there is no direct-current input sigl of the proper polarity present at the terminals 51 and , the alternating potential 20 will be blocked from sup'ing a current flow in the load 90. On alternate halfcles first the hyperconductive transistor switch 40 and n the hyperconductive transistor switch 30 will block.

When a direct current input signal is applied to the minals 51 and 52, so that the terminal 52 is at a negae potential with respect to the terminal 51, the breakwn voltages of the switches 30 and 40 will be decreased the magnitude of the direct-current is increased. Thus increasing the magnitude of the direct-current input th the polarity as shown in FIG. 1, a varying amount voltage may be applied to the load 90 on each half cle of the alternating potential 20. In order to shut conduction of current to the load 90 off, the direct rrent applied to the terminals 51 and 52 may be either creased to zero or the terminal 52 may be made posie with respect to the terminal 51.

Thus by connecting two hyperconductive semi-conctor transsistor switches in a series back-to-back conction with an alternating potential and a load, the w of current through the load may be controlled by application of a small direct-current signal to the first se members of the hyperconductive transistor switches reduce the breakdown voltage of the said hyperconctive switches.

In conclusion, it is pointed out that while the illusted example constitutes a practical embodiment of my vention, I do not limit myself to the exact details shown, ice modification of the same may be varied without derting from the spirit of this invention.

I claim as my invention:

1. In a switching apparatus, in combination, a pair of perconductive transistor switches each having emitter ctrode means, mass-of-metal electrode means and base ctrode means including P and N portions; a source of ernating current; a load unit; a loop circuit including d source of alternating current; said load unit; the iss-of-metal electrode means, the base electrode means, d the emitter electrode means of one transistor; the iitter electrode means, the base electrode means, and mass-of-metal electrode means of the second trantor, back to the source of alternating current; and circuit means for applying a bias potential to each of said se electrode means of each of said hyperconductive nsistor switches, said hyperconductive transistor itches having a predetermined reverse breakdown volt- above which hyperconduction in the reverse direction ough said switches may occur.

2. In a switching apparatus, in combination, a pair of perconductive transistor switches each having emitter ctrode means, mass-of-metal electrode means and base ctrode means including P and N portions; a source of ernating current; a load unit; a loop circuit including d source of alternating current; said load unit; the mass-metal electrode means, the base electrode means, and emitter electrode means of one transistor; the emitter ctrode means, the base electrode means, and the mass-metal electrode means of the second transistor, back to source of alternating current; and circuit means for plying a bias potential to each of said base electrode eans of each of said hyperconductive transistor switches, id hyperconductive transistor switches having a pretermined reverse breakdown voltage above which hyrconduction in the reverse direction through said itches may occur, said reverse breakdown voltage of each said hyperconductive transistor switch varying in accordance with the magnitude and polarity of said applied bias potential.

3. In a switching apparatus, in combination, a pair of hyperconductive transistor switches each having emitter electrode means, mass-of-metal electrode means and base electrode means including P and N portions; a source of alternating current; a load unit; a loop circuit including said source of alternating current; said load unit; the mass-of-metal electrode means, the base electrode means and emitter electrode means of one transistor; the emitter electrode means, the base electrode means, and the mass-of-metal electrode means of the other transistor, back to the source of alternating current; and circuit means for applying a bias potential to each of said base electrode means of each of said hyperconductive transistor switches, said hyperconductive transistor switches having a predetermined reverse breakdown voltage above which hyperconduction in the reverse direction through said switches may occur, said reverse breakdown voltage of each said hyperconductive transistor switch varying in accordance with the magnitude and polarity of said applied bias potential, said alternating potential having a magnitude less than said predetermined breakdown voltage of said hyperconductive transistor switches.

4. In a switching apparatus, in combination, a pair of hyperconductive transistor switches each having emitter electrode means, mass-of-metal electrode means and base electrode means including P and N portions; a source of alternating current; a load unit; a loop circuit including said source of alternating current; said load unit; the mass-of-metal electrode means, the base electrode means and emitter electrode means of one transistor; the emitter electrode means, the base electrode means, and the mass-of-metal electrode means of the other transistor, back to the source of alternating current; and circuit means for applying a bias potential to each of said base electrode means of each of said hyperconductive transistor switches, said circuit means comprising means for connecting a direct current source through current limiting means between said emitter electrode means and base electrode means of each said hyperconductive transistor switch, said hyperconductive transistor switches having a predetermined reverse breakdown voltage above which hyperconduction in the reverse direction through said switches may occur, said reverse breakdown voltage of each said hyperconductive transistor switch varying in accordance with the magnitude and polarity of said applied bias potential, said alternating potential having a magnitude less than said predetermined breakdown voltage of said hyperconductive transistor switches.

5. In a switching apparatus, in combination, a pair of hyperconductive transistor switches each having emitter electrode means, mass-of-metal electrode means and base electrode means including P and N portions; a source of alternating current; a load unit; a loop circuit including said source of alternating current; said load unit; the mass-of-metal electrode means, the base electrode means and emitter electrode means of one transistor; the emitter electrode means, the base electrode means, and the mass-of-metal electrode means of the other transistor, back to the source of alternating current; and circuit means for applying a bias potential to each of said base electrode means of each of said hyperconductive transistor switches, said circuit means comprising means for connecting a direct current source through current limiting means between said emitter electrode means and base electrode means of each said hyperconductive transistor switch, said hyperconductive transistor switches having a predetermined reverse breakdown voltage above which hyperconduction in the reverse direction through said switches may occur, said reverse breakdown voltage of each said hyperconductive transistor switch varying in accordance with the magnitude and polarity of said applied bias potential, said alternating potential having a magnitude less than said predetermined breakdown voltage of said hyperconductive transistor switches.

References Cited in the file of this patent

UNITED STATES PATENTS

| | | |
|---|---|---|
| 2,623,105 | Shockley et al. | Dec. 23, 1952 |
| 2,808,990 | Van Allen | Oct. 8, 1957 |
| 2,816,238 | Elliott | Dec. 10, 1957 |
| 2,838,617 | Tummers et al. | June 10, 1958 |
| 2,891,171 | Shockley | June 16, 1959 |
| 2,895,058 | Pankove | July 14, 1959 |

FOREIGN PATENTS

| | | |
|---|---|---|
| 1,133,506 | France | Nov. 19, 1956 |